United States Patent
Gray (10) Patent No.: US 7,647,403 B2
(45) Date of Patent: Jan. 12, 2010

(54) METHOD FOR PROCESSING A REQUEST FOR ACCESS TO A DATA NETWORK

(75) Inventor: Robert H M Gray, Belfast (GB)

(73) Assignee: British Telecommunications public limited company, London (GB)

( * ) Notice: Subject to any disclaimer, the term of this patent is extended or adjusted under 35 U.S.C. 154(b) by 505 days.

(21) Appl. No.: 10/130,425

(22) PCT Filed: Nov. 29, 2000

(86) PCT No.: PCT/GB00/04551

§ 371 (c)(1),
(2), (4) Date: May 17, 2002

(87) PCT Pub. No.: WO01/41369

PCT Pub. Date: Jun. 7, 2001

(65) Prior Publication Data

US 2002/0188738 A1     Dec. 12, 2002

(30) Foreign Application Priority Data

Nov. 29, 1999   (EP)  ................... 99309560

(51) Int. Cl.
    *G06F 15/173*    (2006.01)
(52) U.S. Cl. .......................... 709/225; 726/4
(58) Field of Classification Search ................. 709/218, 709/225, 229, 224; 713/169, 201; 380/30, 380/247; 726/2, 4, 21; 370/394; 714/4
See application file for complete search history.

(56) References Cited

U.S. PATENT DOCUMENTS

| | | | | |
|---|---|---|---|---|
| 5,434,918 A * | 7/1995 | Kung et al. | ............... | 713/169 |
| 5,491,752 A * | 2/1996 | Kaufman et al. | ............... | 380/30 |
| 5,544,322 A * | 8/1996 | Cheng et al. | ............... | 709/229 |
| 5,621,721 A * | 4/1997 | Vatuone | ............... | 370/394 |
| 5,706,427 A * | 1/1998 | Tabuki | ............... | 713/201 |
| 5,708,710 A * | 1/1998 | Duda | ............... | 380/247 |
| 5,737,523 A * | 4/1998 | Callaghan et al. | ............... | 713/201 |
| 5,764,890 A | 6/1998 | Glasser et al. | | |
| 6,011,910 A * | 1/2000 | Chau et al. | ............... | 709/229 |
| 6,026,440 A * | 2/2000 | Shrader et al. | ............... | 709/224 |
| 6,070,192 A * | 5/2000 | Holt et al. | ............... | 709/227 |
| 6,119,160 A * | 9/2000 | Zhang et al. | ............... | 709/224 |
| 6,219,786 B1 * | 4/2001 | Cunningham et al. | ............... | 713/152 |
| 6,219,790 B1 * | 4/2001 | Lloyd et al. | ............... | 726/14 |
| 6,298,383 B1 * | 10/2001 | Gutman et al. | ............... | 709/229 |
| 6,330,561 B1 * | 12/2001 | Cohen et al. | ............... | 707/10 |
| 6,389,462 B1 * | 5/2002 | Cohen et al. | ............... | 709/218 |
| 6,412,077 B1 * | 6/2002 | Roden et al. | ............... | 714/4 |
| 6,463,474 B1 * | 10/2002 | Fuh et al. | ............... | 709/225 |
| 6,466,977 B1 * | 10/2002 | Sitaraman et al. | ............... | 709/225 |
| 6,571,287 B1 * | 5/2003 | Knight et al. | ............... | 709/225 |
| 6,668,283 B1 * | 12/2003 | Sitaraman et al. | ............... | 709/229 |
| 6,751,608 B1 * | 6/2004 | Cohen et al. | ............... | 707/3 |
| 6,763,468 B2 * | 7/2004 | Gupta et al. | ............... | 726/2 |
| 6,970,930 B1 * | 11/2005 | Donovan | ............... | 709/227 |
| 2004/0030800 A1 * | 2/2004 | Gray et al. | ............... | 709/238 |

FOREIGN PATENT DOCUMENTS

| | | |
|---|---|---|
| GB | 2 306 282 | 4/1997 |
| WO | WO 99/05813 | 2/1999 |
| WO | WO 01/41369 A3 | 6/2001 |

OTHER PUBLICATIONS

Zhang et al., "WebGroup: A Secure Group Access Control Tool For the World Wide Web", Compter Lab, University Of Cambridge, 5 pages.*
Calhoun et al., "Diameter Framework Document", Oct. 1999, Internet Draft, standard track, IETF, 33 pages.*
Petitcolas et al Proceedings 7th IEEE Workshops on Enabling Technologies: Infrastructure for Collaborative Enterprises Jun. 17-19, 1998, Web Group: a secure group access control tool for the World-Wide Web.
Ekstein et al Internet Draft Aug. 1999 XP2141537 Comparison between Radius, Diameter and COPS.
Calhoun Internet Draft XP2141536 Diameter Framework Document.

* cited by examiner

*Primary Examiner*—Andrew Caldwell
*Assistant Examiner*—Benjamin Ailes
(74) *Attorney, Agent, or Firm*—Nixon & Vanderhye P.C.

(57) ABSTRACT

A network access arrangement for connecting an end user's computer to the Internet includes a network access server and a proxy server. When an end user requests to be connected to the Internet, the network access server forwards the access request to the proxy server. The proxy server authenticates some requests itself but forwards other requests to authentication servers for authentication. After receiving a response from one of the servers, the proxy server forwards the response to the network access server. If the proxy server does not receive a response from one of the authentication servers, it follows a default procedure. This can be to authenticate the request in the proxy server or simply to accept the request. The proxy server has a counter associated with each of the servers. Each time the proxy server receives a response from one of the servers, it decrements the appropriate counter. Each time it does not receive a response, it increments the appropriate counter. When one of the counters reaches a threshold value, the proxy server then follows the default procedure for a pre-set number of requests which would normally be forwarded to the appropriate server. After following the default procedure for this predetermined number of access requests, the proxy server forwards the next access requests, which would normally be forwarded to the relevant server, to that server.

10 Claims, 10 Drawing Sheets

| PATTERN 41 | SPECIFIED ATTRIBUTE 42 | PROXY USER IDENTIFIER 43 | AUTHENTICATION ROUTE 44 | ACCOUNTING ROUTE 45 |
|---|---|---|---|---|
| n@d | bti.com | = | 2 | 2 |
| n@d | viag.de | = | 4 | 4 |
| n/d | bti.co.uk | n@bti.com | 1 | 1 |
| n@d | bti.co.uk | = | 3 | 2 |
| CALLING NUMBER PATTERN | SPECIFIED VALUE FOR CALLED NUMBER | | 3 | 2 |

Fig.6.

| ROUTE | PRIMARY | SECONDARY | TERTIARY |
|---|---|---|---|
| 1 | A | B | REJECT |
| 2 | LOCAL | | |
| 3 | ACCEPT | | |
| 4 | C | ACCEPT | |

METHOD FOR PROCESSING A REQUEST FOR ACCESS TO A DATA NETWORK

BACKGROUND OF THE INVENTION

1. Technical Field

This application is the US national phase of international application PCT/GB00/04551 filed 29 Nov. 2000 which designated the U.S.

This invention relates to a method of processing a request at an access server arrangement from a data terminal operated by an end user for access to a data network, and to a network access server and networks including such servers.

2. Related Art

The function of such an access server arrangement is to connect a data terminal, for example a personal computer, operated by an end user to a data network, for example the public Internet. Typically, such an access server arrangement comprises a network access server which receives access requests and provides connections to a data network and an authentication server which can be accessed by the network access server.

In a simple set up, when a network access server receives an access request, it obtains details from the end user relating to the end user such as a user identifier and a password. It then sends these details to the authentication server which authenticates the request by checking these details against expected details which have been previously registered by the end user. If the details received from the end user correspond to the expected details, then the request is accepted and the end user's data terminal is connected to the data network. If the details are not as expected, then the access request is rejected.

In a modification of the simple set up, for some or all services, the authentication server acts as a proxy server. For each of these services, when the proxy server receives an access request from the network access server, it forwards the request to the relevant authentication server. This authentication server then checks the details. If the details received correspond to the expected details, then the authentication server sends an access accept message to the proxy server. If the details are not as expected, then the authentication servers sends an access reject message back to the proxy server. The proxy server then forwards the access accept or access reject message to the network access server. If the network access server receives an access accept message, then it connects the data terminal operated by the end user to the data network. If it receives an access reject message, then access to the data terminal is refused.

However, if an authentication server fails to respond to an access request message with either an access accept message or an access reject message, the consequence can be that the access request message from the data terminal operated by the end user is not dealt with in a satisfactory manner.

BRIEF SUMMARY OF THE INVENTION

According to a first aspect, the invention provides a method of processing a request at an access server arrangement from a data terminal operated by an end user for access to a data network, said method comprising the steps of:

receiving a request from the data terminal at the access server arrangement for access to the data network;

in the event that a predetermined criterion is not satisfied:

(i) attempting to forward the access request to an authentication server;

(ii) if a response is received from the authentication server, dealing with the access request in accordance with the response; and (iii) if a response is not received from the authentication server, dealing with the access request in accordance with a default procedure; and in the event that the predetermined criterion is satisfied, dealing with the access request in accordance with a default procedure.

This aspect of the invention helps ensure that access requests are handled in a satisfactory manner.

In one embodiment of the invention, the method includes the following steps:

if a response is not received from an authentication server, changing the value held in a counter by one unit in one direction; and if a response is received from an authentication server, changing the value held in the counter by one unit in the other direction; and the predetermined criterion is reached when the value held in the counter has progressed in said one direction to a predetermined threshold.

Preferably, in the event that the counter has reached said predetermined threshold, the method includes the steps of performing the default procedure for a predetermined number of times, then changing the value held in the counter by one unit in the other direction, and then making an attempt to forward the next access request to the authentication server.

BRIEF DESCRIPTION OF THE DRAWINGS

This invention will now be described in more detail, by way of example, with reference to the drawings in which.

DETAILED DESCRIPTION OF EXEMPLARY EMBODIMENTS

Figure 1:
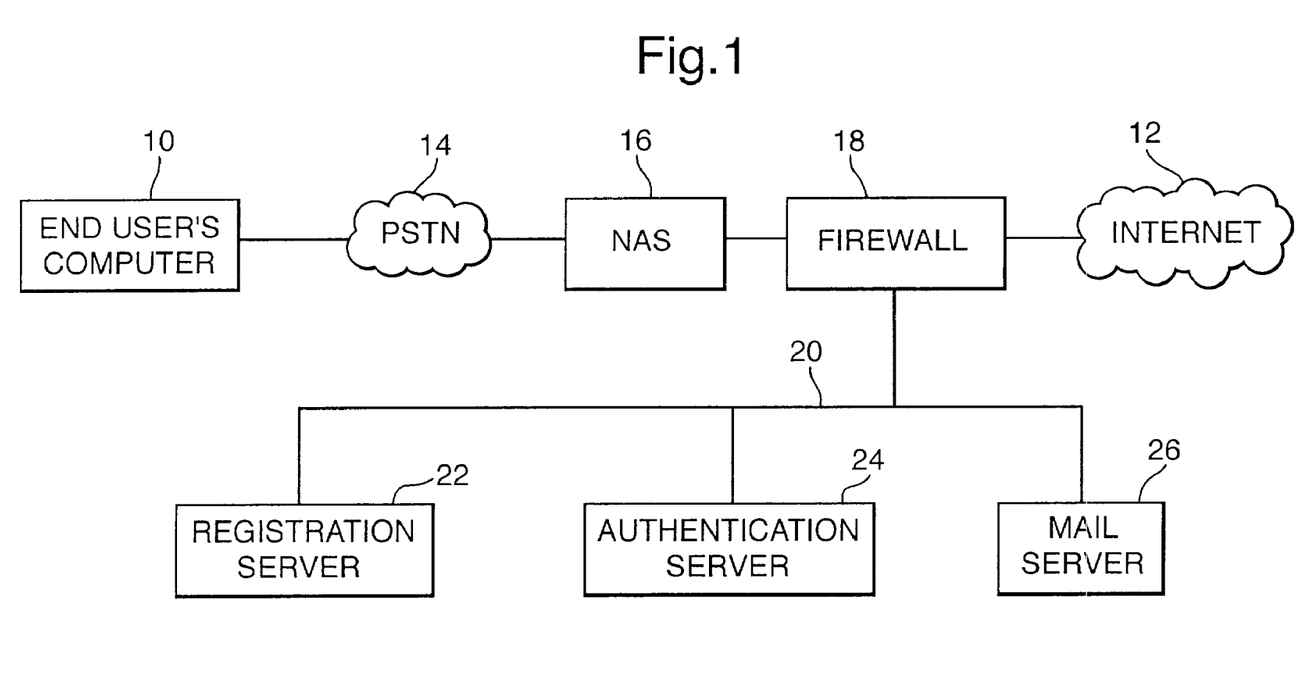
FIG. 1 is a block diagram showing an access server arrangement for connecting computers operated by end users to the public Internet.

Referring now to FIG. 1, there is shown an arrangement for connecting a data terminal in the form of a computer 10 operated by an end user to the public Internet 12. Although this invention will, by way of example, be described with reference to the public Internet, it is to be appreciated that the invention could be used for gaining access to other types of data network. In this specification, the term "end user" indicates an individual person who wishes to use his or her computer to gain access to the public Internet or another data network.

As shown in FIG. 1, the end user's computer 10 can be connected to the public Internet 12 through the public switched telecommunications network (PSTN) 14, a network access server (NAS) 16 and a firewall 18. In this example, the end user's computer 10 has a modem for converting the digital signals generated in the computer 10 to modulated analogue signals for transmission through the PSTN 14 and also for converting modulated analogue signals received from the PSTN 14 into digital signals for use within the computer 10. The NAS 16 has a bank of modems for answering calls from end user's computers. By way of modification, the invention can also be used for providing access to the public Internet where the connection between the end user's computer and the NAS is digital, for example, using integrated services digital network (ISDN) technology or asynchronous digital subscriber loop (ADSL) technology. Where a digital connection is used, modems are not needed. Network access servers are presently available from several vendors including Cisco, Ascend and Lucent. Another name for a network access server is Remote Access Server. For reasons of simplicity, FIG. 1 shows a single network access server. In practice, in order to provide the desired capacity, there is usually a set of network access servers at a single location.

As is well known, in the public Internet 12, data packets are routed using the well-known Internet Protocol (IP) and transported using the well-known connection-oriented Transmission Control Protocol (TCP). The computer 10, NAS 16 and firewall 18 are all capable of receiving and transmitting data packets which use these protocols.

As shown in FIG. 1, the firewall 18 is also connected to a private data network 20. A registration server 22, an authentication and accounting server 24 and a mail server 26 as well as other servers, not shown, are also connected to network 20. In the network 20, data packets are routed using IP. Between the NAS 16 and the registration server 22 and the mail server 26, packets are transported using TCP. However, to avoid delays, between the NAS 16 and the authentication and accounting server 24, the transport protocol is the well known connectionless User Datagram Protocol (UDP). The mail server 26 uses two well known higher level protocols. Between the mail server 26 and other mail servers, the Simple Message Transport Protocol (SMTP) is used. Between the mail server 26 and computers operated by end users, Post Office Protocol number 3 (POP3) is used. The mail server 26 will not be described further as it does not form part of this invention.

Between the NAS 16 and the authentication and accounting server 24, a higher level protocol known as the Remote Authentication Dial-In User Service (RADIUS) is used. This protocol is used to pass attributes between the NAS 16 and the authentication and accounting server 24. A user password and a user identifier are examples of such attributes. Each message transmitted using the RADIUS protocol serves a particular purpose and the purpose is specified in the message. A request for a user to be given access to the Internet 12 is an example of such a purpose. The RADIUS protocol was devised by Livingston Enterprises Inc. and it is becoming an industry standard for Internet access authentication and accounting. Authentication is a process of verifying a user's details to decide whether a user can be given access to the Internet. Accounting is a method of collecting information on the use of the Internet by an end user which can be used for billing, auditing and reporting.

The firewall 18 protects the NAS 16 and the servers 22, 24 and 26 from intrusion from users of the Internet 12.

In this example, the NAS 16, the firewall 18 and the servers 22, 24 and 26 form an access server arrangement and belong to a single organisation. Because this organisation is responsible for providing access for end users to the Internet, the organisation is known as an Internet service provider. However, as will be described in more detail below, the server 24 can be modified so that it can also "proxy" or forward access request messages to other authentication and accounting servers. These other servers may belong to the same Internet service provider as the authentication server 24 or to other Internet service providers. Alternatively, the other servers may belong to the same organisation as the authentication server 24 but be managed separately within that organisation. Where an access request message is forwarded to another server, then that server, rather than the server 24, is responsible for authentication or accounting. Where the server 24 is serving the function of forwarding messages, rather than responding to the messages itself, it is referred to as a proxy server.

Figure 2:
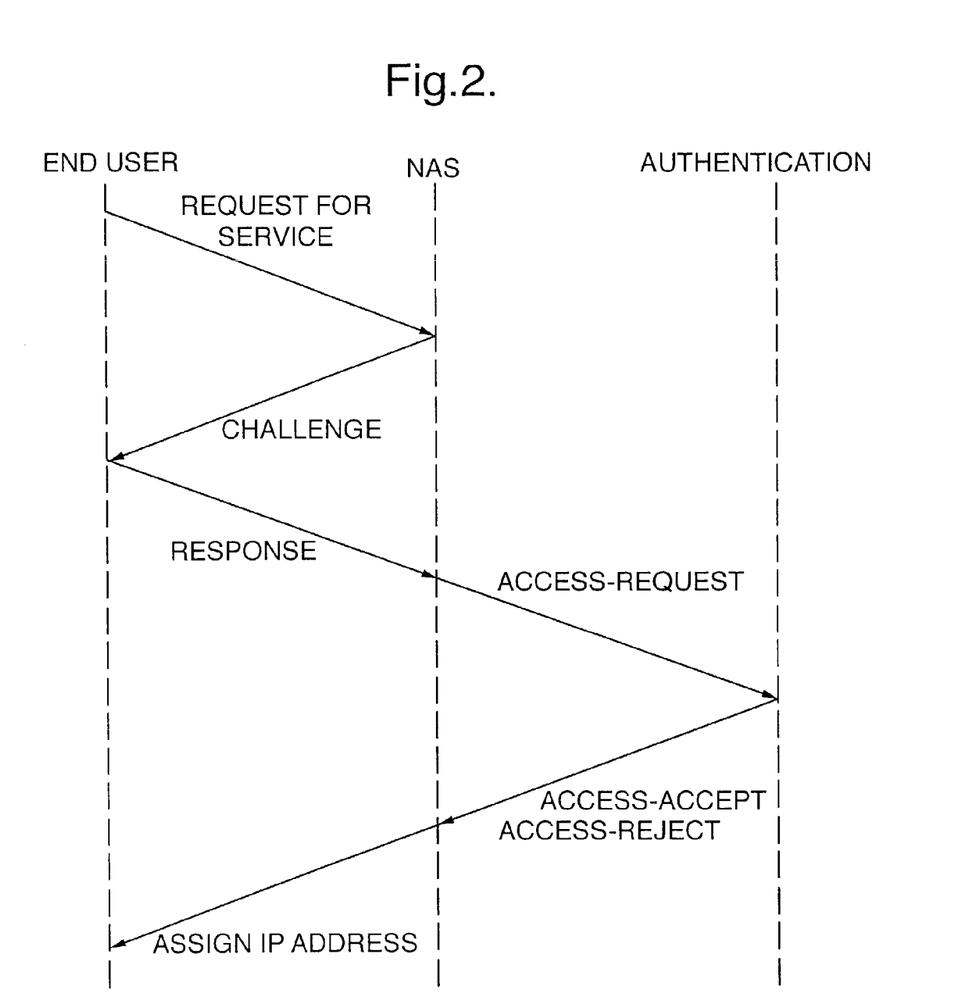
FIG. 2 is a graph showing the sequence of operations which are followed in the access server arrangement of FIG. 1 in authenticating an access request from an end user.

Before an end user can gain access to the Internet 12, the end user is usually given a user identifier and a password. The user identifier and password are issued, online, by the registration server 22 and these details are held in a database, not shown, which can be accessed by the authentication and accounting server 24. Where an Internet service provider requires an end user to have a user identifier and a password, these details are checked by the authentication and accounting server 24, during an authentication phase, before giving an end user access to the Internet 12. Some Internet service providers do not require the end user to have a user identifier or a password. In the case of such Internet service providers, the authentication and accounting server 24 usually checks some other detail, such as the number called by the end user's computer, before permitting access to the Internet.

Where an end user has a user identifier and a password, the sequence of events which occur in responding to a request from the end user's computer for access to the Internet 12 will now be described with reference to FIG. 2.

When the end user wishes to access the Internet 12, the computer 10 dials the NAS 16. The PSTN 14 then provides a link between the computer 10 and the NAS 16. Traffic is carried over this link between the computer 10 and the NAS 16 using the Point-to-Point Protocol (PPP) and two further protocols which are the Link Control Protocol (LCP) and the Internet Protocol Control Protocol (IPCP). The LCP is responsible for configuring and testing the link between the computer 10 and the NAS 16 and the IPCP is responsible for handling IP packets at each end of the link and negotiating the compression technique to be used.

When the link has been configured and tested, the computer 10 sends a request for service message to the NAS 16. The NAS 16 then sends a challenge message to the computer 10. The purpose of this message is to obtain the user's identifier and the user's password. On receiving this message, the end user enters his or her details on the computer 10 and the computer 10 then transmits these details to the NAS 16 in a response message. The password itself is transmitted using one of two protocols. These protocols are the Password Authentication Protocol (PAP) and the Challenge Handshake Authentication Protocol (CHAP). Both of these protocols provide some security but CHAP is more secure than PAP. These protocols are well known and will not be further described.

When the NAS 16 has received these details, it transmits an access-request message containing these details received from the end user to the authentication and accounting server 24. The access-request message also contains further details, such as an identifier for the NAS 16 itself and the calling party's telephone number of the telephone line used by computer 10.

The server 24 then checks the details received from the NAS 16 against details held in the database. If the user's details do not correspond to the details held in the database, then the server 24 sends an access-reject message to the NAS 16, which then terminates the call. If the details obtained from the computer 10 are as expected, then the server 24 sends an access-accept message to the NAS 16. If the NAS 16 receives an access-accept message, then it assigns an IP address to the computer 10, transmits this to the computer 10 in an assign IP address message and then allows traffic to pass between the computer 10 and the Internet 12.

As mentioned above, some Internet service providers do not require an end user to have a user's identifier or password. When using a service provided by such an Internet service provider, the sequence outlined above is modified as follows.

The computer 10 still sends a request for service message to the NAS 16 and the NAS 16 still sends a challenge message to the computer 10. However, the response message from the computer 10 to the NAS 16 will not contain a user identifier or a user password and so these details are not included in the access-request message from the NAS 16 to the server 24. However, the access-request message may contain some other information, for example the number dialled by the computer 10. On receiving the access-request message, the server 24 checks the information contained in the access-request message against expected information. For example, it might check the number dialled by the computer 10 to see if the expected number was, in fact, dialled. If the information received from the NAS 16 corresponds to the expected information, then an access-accept message is transmitted to the NAS 16, which then permits traffic between the computer 10 and Internet 12 as described above. If the information received from the NAS 16 does not correspond to the expected information, the server 24 sends an access-reject message to the NAS 16. The NAS 16 then terminates the call.

When an end user wishes to register with an Internet service provider, then during registration the sequence of events described above is modified as follows. The end user's computer 10 still sends a request for service message to the NAS 16 and the NAS 16 still sends a challenge message back to the computer 10. At this stage, the end user is unable to enter a user identifier or password and so the response message cannot contain these details. These details are also absent from the access-request message sent by the NAS 16 to the server 24. As the access-request message contains neither a user identifier nor a password, the server 24 interprets the access-request message as a request for registration. It therefore sends an access-accept message to the NAS 16 but the message contains an instruction to the NAS 16 to apply a filter to IP packets received from the computer 10. The NAS 16 then assigns an IP address to the computer 10. The NAS 16 then permits traffic from the computer 10 to pass through it but subject to the filter. Normally, the filter would specify that only packets destined for the registration server 22, or received from this server, can pass through the NAS 16. Consequently, the end user can then register with the Internet service provider and thus obtain a user identifier and password.

Figure 3:
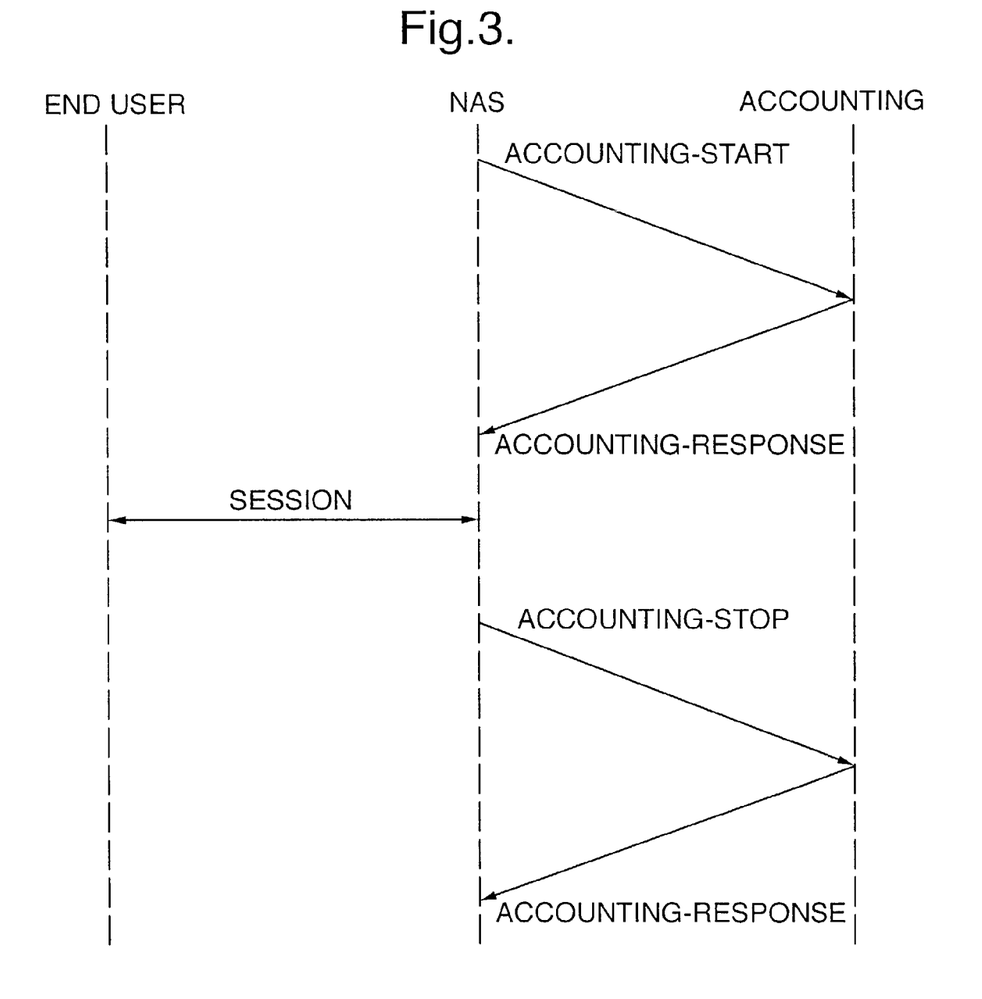
FIG. 3 is a graph showing the sequence of operations which are followed in the access server arrangement of FIG. 1 providing an accounting record of an end user's session on the Internet.

Referring now to FIG. 3, immediately before the NAS 16 allows Internet traffic to pass between the computer 10 and the Internet 12, it sends an accounting-start message to the server 24. The server 24 then logs the time at which the session is commencing and certain other details relating to the end user. It also sends an access-response message to the NAS 16. The user's Internet session then proceeds. Immediately after the session has terminated, the NAS 16 sends an accounting-stop message to the server 24. The server 24 then logs the time at which the session has ended and sends an accounting-response message to the NAS 16. Accounting information is held for two purposes. Firstly, it provides basic information which allows a service provider to issue usage-based billing. Secondly it provides an audit trail of the user's connection time, IP address and certain other details which may be needed for legal reasons.

Figure 4:
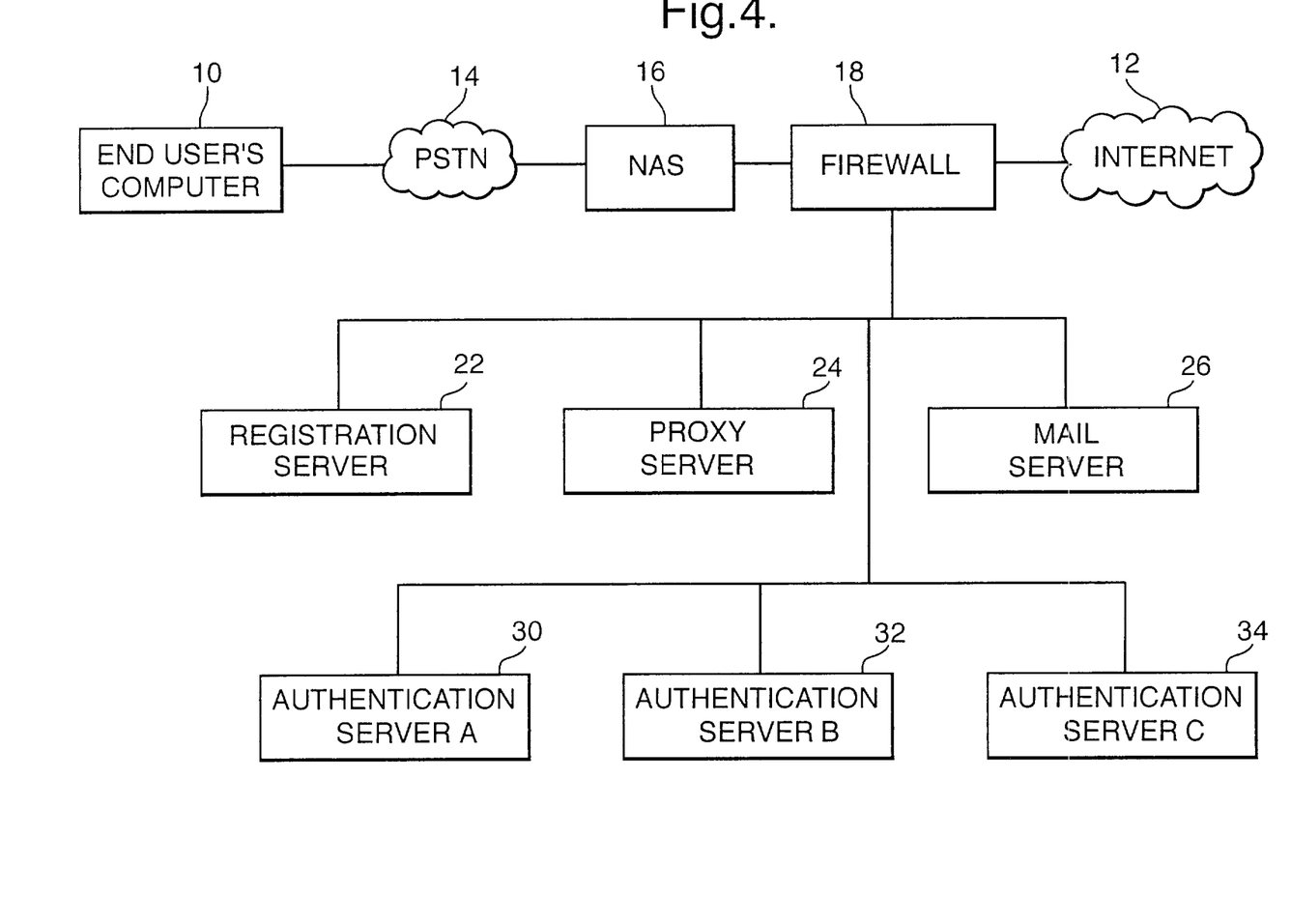
FIG. 4 is a block diagram showing a modification to the arrangement of FIG. 1 in which access requests can be forwarded from a proxy server to three authentication servers.

As mentioned above, the server 24 can be modified so as to forward access request messages to other servers for authentication and accounting. Referring now to FIG. 4, there is shown an arrangement in which the server 24 can forward access request messages to authentication server A (server 30), authentication server B (server 32) or authentication server C (server 34). Each of the servers 30, 32 and 34 is capable of performing both authentication and accounting. The server 24 is still capable of authentication and accounting but will now be referred to as a proxy server as it is also capable of forwarding access request-messages. Servers A, B and C may belong to the same Internet service provider as the Internet service provider which owns the NAS 16 and the proxy server 24 or to other Internet servers providers. Alternatively, the servers A, B and C may belong to the same Internet service provider as the NAS 16 and the proxy server 24 but be managed separately within that organisation. Although, by way of example, in FIG. 4 the proxy server 24 is capable of forwarding access request messages to three other servers, it could of course be modified so as to forward such messages to a smaller or greater number of servers. The proxy server 24 could also be arranged to instruct the NAS 16 to form a tunnel to a home gateway. Home gateways are discussed below with reference to FIG. 10.

A simple procedure for handling access request messages in the proxy server 24 will now be described. In this simple procedure, when the proxy server 24 receives an access request message from the NAS 16 containing a user identifier, it splits the user identifier into a user name part and a domain part. This simple procedure can only be used where all user identifiers received by the NAS 16 follow the same pattern. An example of such a pattern is n@d, where n is the value of the user name and d is the value for the domain. After splitting up the user identifier into two parts, the proxy server 24 consults a database table. For each of the possible domains, this table specifies the server which is responsible for performing authentication and accounting operations in response to an access request message. If the relevant server is the proxy server 24 itself, it performs authentication and accounting as described above. If the appropriate server is one of the servers A, B and C, the proxy server 24 forwards the access request message to the appropriate one of these servers. The appropriate server then performs authentication and sends a response message to the proxy server 24 which, in turn, forwards it to the NAS 16. The NAS 16 then provides or denies the connection as specified in the response message. The server which has performed the authentication operation also performs the accounting operation.

As described above, the simple procedure is only capable of handling access request messages in which all user identifiers follow the same pattern. Also, the simple procedure is limited to either performing authentication and accounting in the proxy server 24 itself or forwarding the access request message to one of the servers A, B and C for authentication and accounting. There will now be described, with reference to FIGS. 5 to 7, an improved procedure for handling access request messages in which the user identifiers can follow several different patterns. The improved procedure also provides more possibilities for handling access request messages. These possibilities include re-writing a user identifier before forwarding an access request message to another server, providing different servers for authentication and accounting, the provision of a default server in the event that a server is unable to perform either authentication or accounting, and handling an access request message which does not include a user identifier or password.

Figure 5:
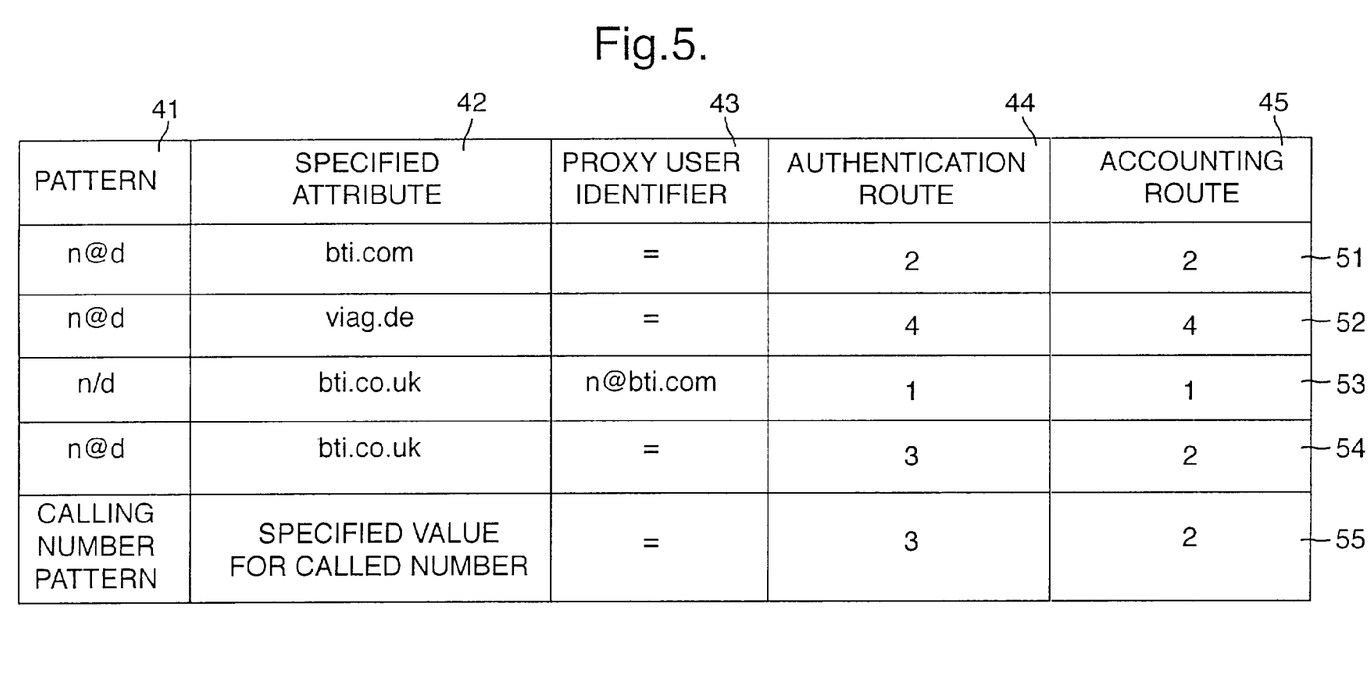
FIGS. 5 and 6 are tables which are used by the proxy server of FIG. 4 in handling access requests.

Referring now to FIG. 5, there is shown a table which has five columns 41-45 and five rows 51-55. Each of the rows 51-55 contains a rule which specifies how an access request message is to be handled by the proxy server 24. The information which specifies how an access request message is to be handled is contained in columns 43-45. When an access request message arrives at proxy server 24, the relevant rule has to be identified and the information for doing this is contained in columns 41 and 42. The procedure for identifying the relevant rule will now be described and this will be followed by an explanation of the various possibilities, specified in the rules, for handling access request messages.

When an access request message which contains a user identifier arrives at proxy server 24, the pattern of the user identifier in the access request message is compared with the patterns shown in column 41 (headed "Pattern") for each of rows 51-54 in turn. In the example shown in FIG. 5, the pattern shown in rows 51, 52 and 54 is of the type n@d and the pattern shown in row 53 is of the type n/d. When a match is found between the pattern in the user identifier in the access request message and a pattern in one of rows 51-54, the identified pattern is used to split the user identifier into the user name part and a domain part.

Next, for an access request message which contains a user identifier, the domain part of the user identifier is compared with the values given in column 42 (headed "Specified Attribute") for each of rows 51-54 until a match is found. The row in which the match is found is then identified as containing the rule which specifies the procedure for handling this particular access request message.

It should be noted that, in order to identify the relevant rule, both the pattern of the user identifier in an access request message and the value of its domain must match, respectively, the pattern shown in column 41 and the value given for the domain in the same row in column 42. For example, if a user identifier has a pattern n@d and the domain part has a value bti.co.uk, then the relevant rule is specified in row 54 rather than in row 53.

If the access request message does not contain a user identifier, then a match will not be found for any one of the patterns in column 41 for rows 51-54. When a match is not found in any one of rows 51-54, the pattern of the calling number is checked against a pattern for the calling number specified in column 41 of row 55. In this example, the specified pattern is that the calling number is formed solely from digits. If a match is found between the pattern of the calling number and the specified pattern, the calling number is compared with a specified value in column 42 of row 55. If a match is found, then row 55 is identified as containing the rule which specifies the procedure for handling the access request.

The table shown in FIG. 5 could be expanded to include one or more further columns which contain values for further attributes. Where there are one or more further columns, then the relevant row, and hence the relevant rule, will be identified when the value of the domain part of the user identifier contained in the access request message and also the values of the relevant further attributes also match the values specified in these columns.

By way of modification, the table shown in FIG. 5 could contain rules for splitting up other attributes, for example the calling number, in the access request message.

After the relevant row, and hence the relevant rule has been identified, then the proxy server 24 consults column 43 (headed Proxy User Identifier). The purpose of this column is to specify whether or not the user identifier is to be written before forwarding an access request message to another server. In this example shown in FIG. 5, in each of rows 51, 52, 54 and 55, column 43 has an "=" sign. This denotes that the user identifier is not re-written before forwarding the access request message to another server. However, in row 53, the entry is "n@bti.com". This is an instruction to re-write the user identifier from the form n/d to the form n@d and to use bti.com as the value for the domain part of the user identifier.

Although not shown in FIG. 5, there can be two further columns, which are similar to column 43, which contain instructions for re-writing the user identifier for internal use within the proxy server 24 for authentication and accounting.

After consulting column 43, the proxy server 24 then consults column 44 (headed Authentication Route) and column 45 (headed Accounting Route). These contain instructions for the route through to be followed for authentication and accounting. In the present example, there are four possible routes, namely routes 1-4. For example, it will be seen that, in row 51, both the authentication and accounting routes are route 2. In row 54, the authentication route is route 3 but the accounting route is route 2. Thus the accounting and authentication routes can be different. The details for each route are set out in the table shown in FIG. 6 and this table will now be described.

Figure 6:
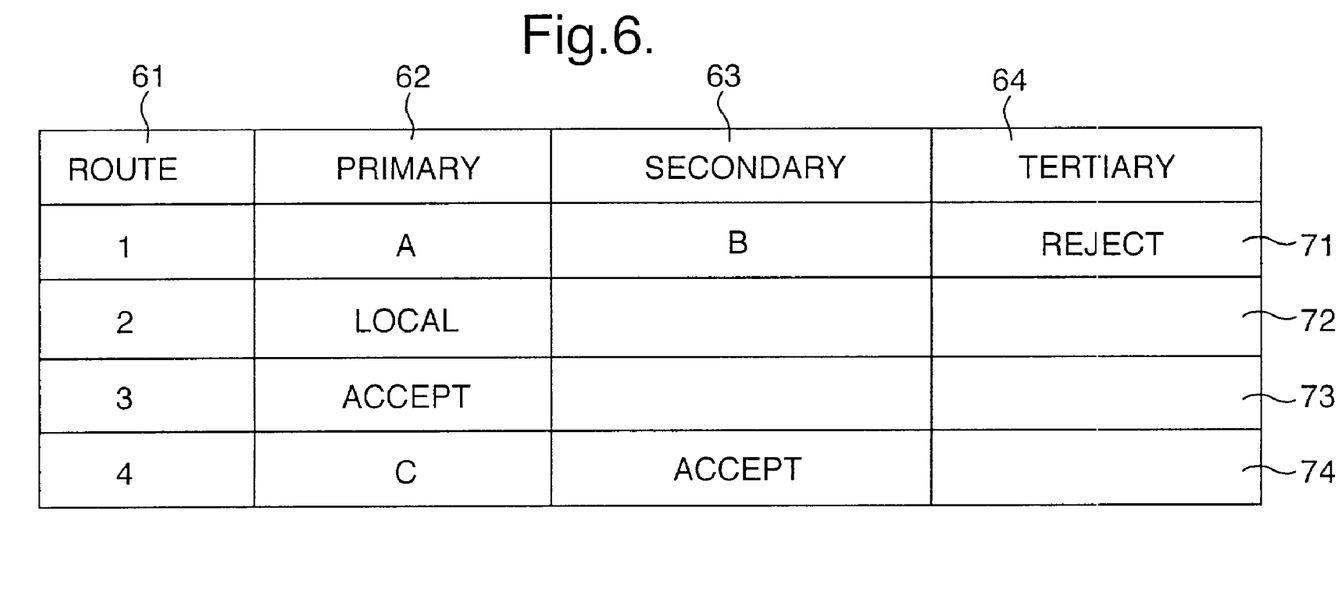

Referring now to FIG. 6, it will be seen that the table has four columns 61-64. Column 61 (headed Route) gives the number of the route. It will be seen that there are four rows 71-74 corresponding to the four different routes. Generally, the number of rows will be equal to the number of possible routes.

The column 62 (headed Primary) gives the name of the server which is the main or first choice for performing the relevant (authentication or accounting) operation. Column 63 (headed Secondary) and column 64 (headed Tertiary) give the first alternative and the second alternative choice for performing the relevant operation in the event that the server specified in column 62 is unable to perform the operation.

Thus, in row 71 (route 1), it will be seen that the first choice for performing the relevant operation is the server A. If the server A is unable to perform the operation, then as a default procedure, the server B is instructed to perform the relevant operation. If the server B is unable to perform the relevant operation, then as a further default, as indicated in column 64, the access request is rejected.

As shown in row 72 (route 2), it will be seen that the entry for the first choice for performing the relevant operation is marked "local". This is an instruction to perform the relevant operation in the proxy server 24 itself. In the case of route 2, there are no default or alternative choices for performing the relevant operation.

In the case of row 73 (route), it will be seen that the entry for the first choice for performing the relevant operation is marked "accept". This is simply an instruction to accept the access request.

In row 74 (route 4), it will be seen as the first choice for performing the relevant operation for route 4 is server C. As shown in the entry in column 63, it will be seen that the default action is to accept the access request.

Referring back to FIG. 5, it is to be appreciated that further columns could be added to provide further instructions for processing an access request message. For example, there could be an instruction for the NAS 16 to apply a filter. This would have the effect of preventing the end user from accessing certain addresses in the Internet 12.

Figure 7:
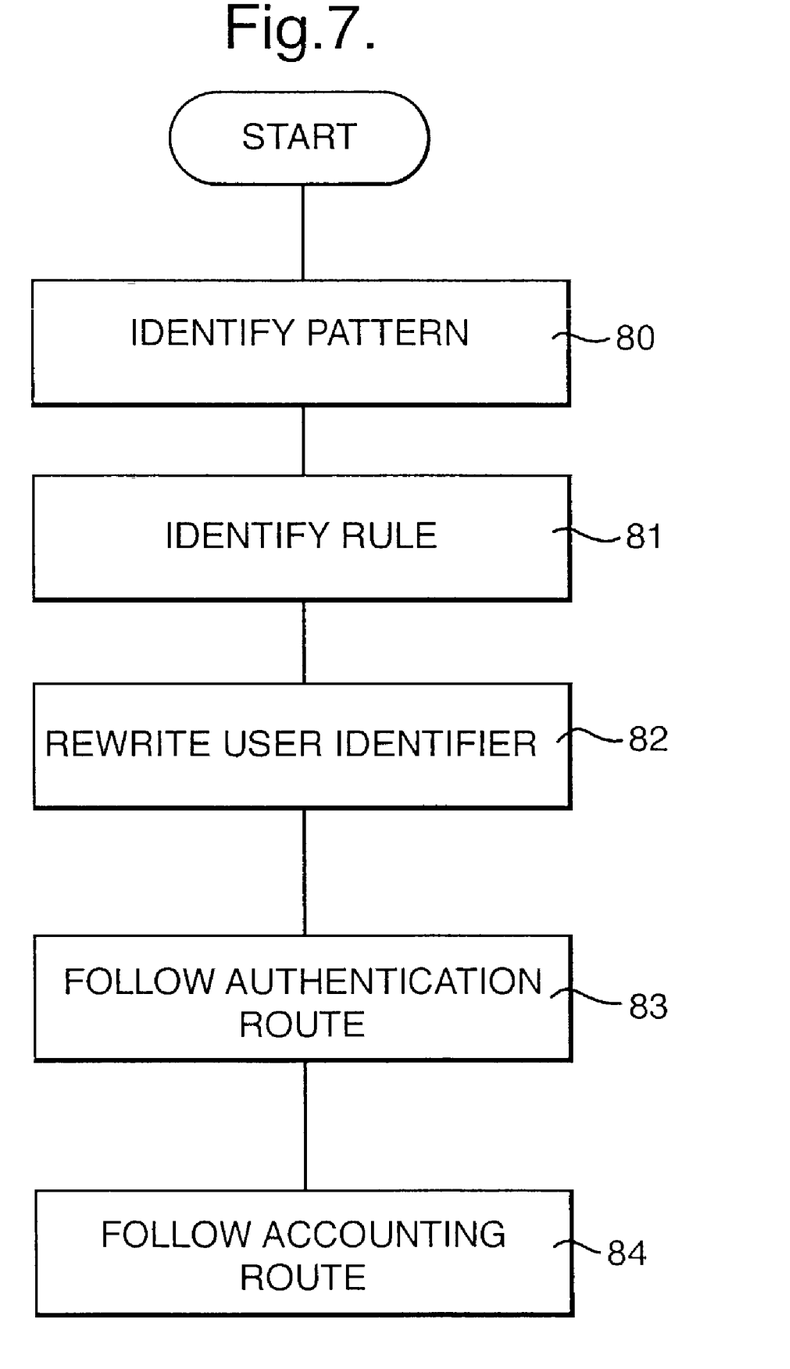
FIG. 7 is a flow chart of a series of operations which are performed by the proxy server of FIG. 4 in handling an access request.

The procedure for handling an access request message will now be summarised with reference to the flow chart shown in FIG. 7.

Initially, in step 80, the details relating to the end user are compared with each one of a set of patterns in turn until a match is found. As described above, this is performed by using the entries in column 41 of the table shown in FIG. 5. Then, in a step 81, the relevant rule is identified. In the example shown in FIG. 5, this is performed by comparing the details relating to the end user with a specified value for one attribute for each rule in turn until a match is found. Then, in step 82, if appropriate, the user identifier is re-written before forwarding it to another server using the entries set out in column 43. In steps 83 and 84, the access request message is processed using the authentication route as set out in column 44 and the accounting route as set out in column 45.

The procedure described with reference to FIGS. 5 to 7 can also be used with the network access arrangement shown in FIG. 1. However, when so used, the option of forwarding an access request to another server is clearly not available.

Referring now back to FIG. 5, each of rows 51 to 55 contains a rule for a particular access service provided by the NAS 16. The columns 44 and 45 contain the routes for performing authentication for the various services. Thus, for the service of row 51, the primary choice for both authentication and accounting is the proxy server 24. In the case of the service of this row, there is no alternative choice or default procedure for authentication and accounting. In the case of the service of row 52, the primary choice for both authentication and accounting is the authentication server C. In the case of the service of this row, if the proxy server 24 sends an access request message to the authentication server C but does not receive a response, the proxy server 24 proceeds to the secondary choice, specified in column 63 of FIG. 6, for dealing with the access request message from the NAS 16. In this case, the default action is to accept the access request and therefore to send an access accept message back to NAS 16.

In the case of the service of row 53, the primary choice for both authentication and accounting is the authentication server A. If the proxy server 24 does not receive a response from an access request message which it sends to authentication server A, then it proceeds to the secondary choice specified in column 63 of FIG. 6. In this case, the secondary choice or default action for dealing with the access request message from NAS 16 is to forward the access request message to the authentication server B.

In the case of the service of row 54, the primary, and only, action for dealing with authentication, is to accept the access request message. In the case of the service of row 54, the primary and only action for accounting, is to handle accounting locally in the proxy server 24.

In the case of the services of rows 53 and 52, there will be occasions when the primary choice for authentication and accounting fails. This may be caused, for example, by a brief interruption in the transmission link between the proxy server 24 and either the server A or the server C, or a brief failure or overload in either server A or server C. In such situations, the default action specified in column 63 should be sufficient to ensure that a satisfactory response can be sent by the proxy server 24 to the NAS 16.

However, in the case of the services of rows 53 and 52, there will be occasions when either server A or server C fails to respond to an access request message from the proxy server 24 over a prolonged period. This could be caused either by a failure in the communications link between the proxy server 24 and either server A or server C or a complete failure in either server A or server C. If such a failure does occur, then access request messages for the corresponding service will be queued in proxy server 24 before they are handled by proxy server 24 in accordance with the default action. If this happens, then the queue of access request messages in proxy server 24 for the relevant service will lengthen and proxy server 24 will be effectively saturated with these requests. Consequently, the delay in sending a response to NAS 16 will increase to the point at which it reaches the time out period of NAS 16 for receiving a response. If this happens, NAS 16 will apply its own default action which is to refuse access requests for the relevant service. Clearly, this is unsatisfactory for the end users.

There will now be described with reference to FIG. 8 a process which is performed in the proxy server 24 for overcoming this problem. The process is performed for each access request message which relates to a service for which the primary choice for handling the authentication request message from the NAS 16 is to forward it to another server and a separate process is performed for each such service. For each access request message from the NAS 16, this process is performed after step 81 shown in FIG. 7.

Figure 8:
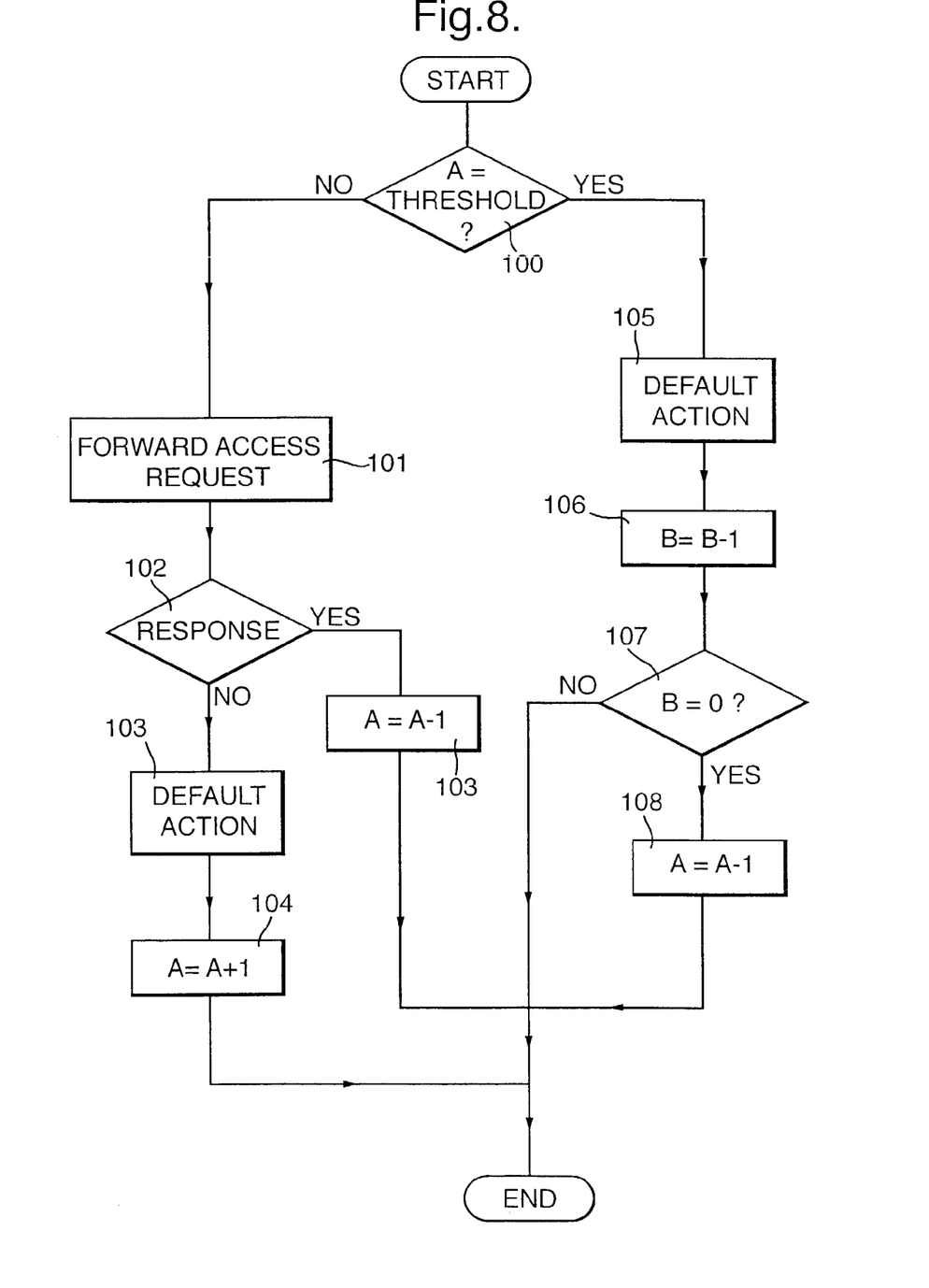
FIG. 8 is a flow chart of another series of operations which are performed in the proxy server of FIG. 4 in handling an access request.

Referring now to FIG. 8, this process uses two software counters, namely counter A and counter B. Each of these counters is initially set to zero.

For each access request message, in an initial step, the value of counter A is compared with a threshold value in a step 100. If the value of counter A is below the threshold value, then in a step 101, the access request message is forwarded to the appropriate authentication server, for example server A for server B. Then, in a step 102, the proxy server waits for a response from the appropriate authentication server. If a response is received, then counter A is decremented in a step 103 and the process then ends for this access request message.

If in step 102 no response is received from the relevant authentication counter, then the default action is followed in a step 103. As mentioned above, the default actions are shown in column 63 in FIG. 6. After step 103, counter A is incremented in a step 104 and the process then ends for this access request message.

In step 100, on the first occasion that it is found that the value in counter A equals the threshold value, then counter B is set to a threshold value. As will be seen, this threshold value represents the number of access request messages for which default action is followed before another attempt is made to forward an access request message to the relevant authentication server.

After step 100, the default action is followed in a step 105 and the counter B is then decremented in a step 106. As mentioned above, the default actions are shown in column 63 in FIG. 6.

Then, in a step 107, if the value in counter B does not equal zero, the process ends for this request message. If the value in counter B does equal zero, then in a step 108, counter A is decremented. The result of this is that the next access request message will be forwarded to the relevant authentication server. The process then ends for this access request message.

Thus, in the normal course of events, the value in counter A fluctuates up and down between zero and its threshold value as long as the relevant authentication server is handling nearly all of the access request messages which are forwarded to it. However, when there is a failure, then the default action is followed for a number of access request messages equal to the threshold value of counter B.

As a result of following this process, in the event that one of the authentication servers fails to respond for a prolonged period, the proxy server 24 does not saturate and sends a response to the NAS 16 for each access message before the time out period is reached.

Although the process shown in FIG. 8 has been described with reference to handling access request messages, it can also be used for accounting. In order to achieve this, the default action shown in step 105 includes the default action for accounting as well as for authentication.

Referring back to FIG. 4, the organisation which manages the network access server 16 and the proxy server 24 may be separate from the organisations which manage the authentication servers A, B and C. An organisation which manages one of the servers A, B or C may wish, on some occasions, to specify a filter in an access accept message. Where a filter is applied by the network access server 16, then traffic from the end users computer 10 to the Internet 12 is restricted to one or more specified addresses.

The RADIUS protocol mentioned above does include a field for specifying a filter. Unfortunately, the vendors of network access servers tend to provide their own proprietary methods. Consequently, it is usually not possible to specify a filter using the attribute field in the RADIUS protocol and this creates difficulties in specifying a filter in an access accept message transmitted by one of the authentication servers A, B and C.

Also, the organisations which manage the servers A, B and C may wish to have the opportunity to specify both static and dynamic filters. A static filter consists of a named item which has to be configured and agreed prior to use. For example, a static filter might be configured to restrict access just to a registration server. In contrast, a dynamic filter does not have to be agreed in advance and specifies that access is to be restricted to either a single address or a range of addresses. Unfortunately, the attribute field in the RADIUS protocol does not cover the possibility of specifying a dynamic filter. Consequently, it is difficult to specify a dynamic filter in an access accept message produced by one of the servers A, B or C.

There will now be described a process which permits the authentication servers A, B and C to specify both static and dynamic filters in an access accept message and without having knowledge of the type of network access server which will be used to make a connection between an end-user's computer and the Internet.

In this process a standard protocol is agreed between the organisation which manages the proxy server 24 and the organisations which manage the servers A, B and C. This protocol permits the authentication servers A, B and C to specify both static and dynamic filters. It specifies the format for each type of filter. In this example, an access accept message can specify either a static filter or up to 10 dynamic filters. It cannot specify both static and dynamic filters. As will be explained, the proxy server 24 translates a filter specified in an access request message in to the protocol used by the network access server 16. Although FIG. 4 shows only a single access server 16, in a more complicated arrangement, the proxy server 24 may receive access request messages from several clusters of network access servers provided by several different vendors.

Figure 9:
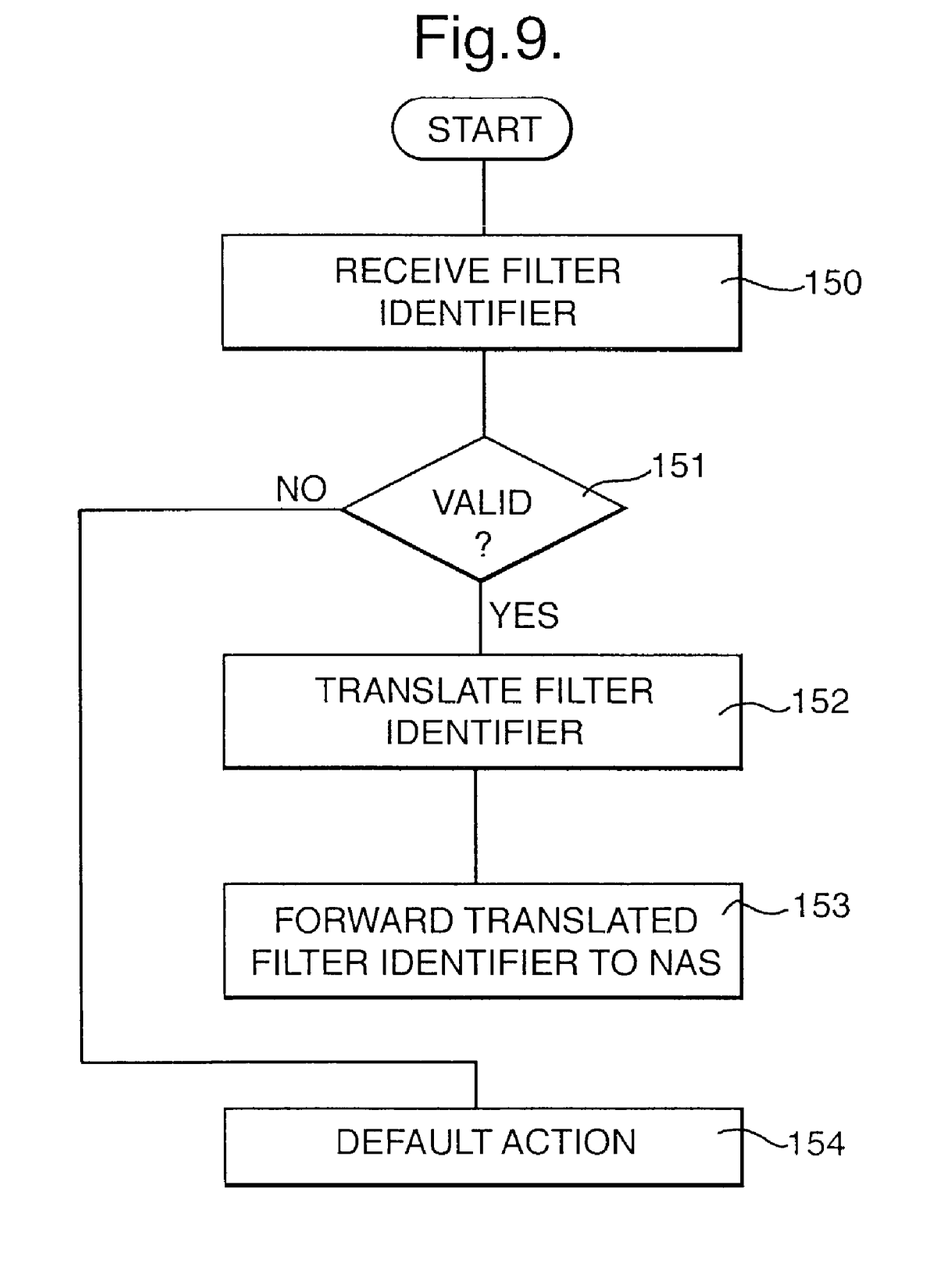
FIG. 9 is a flow chart of a set of operations performed by the proxy server of FIG. 4 when handling an access accept message from an authentication server.

In this process, on receiving an accept message containing a filter identifier, the proxy server 24 performs the operation shown in FIG. 9.

Referring now to FIG. 9, in a step 150, the proxy server 24 receives an access accept message containing a filter identifier.

Then, in a step 151, the proxy server 24 checks that the filter identifier is valid. As mentioned above, a mixture of static and dynamic filters is not permitted. Therefore, if a filter identifier contains a mixture of static and dynamic filters, it is found invalid. Also, as mentioned above, if a filter identifier specifies more than 10 dynamic filters it is found invalid. Also, the proxy server 24 checks that each filter is specified in the correct format. If an incorrect format is used, then the filter identifier is found invalid.

If the filter identifier is valid, then the proxy server 24 performs step 152. In this step, it translates the filter identifier from the standard protocol to the protocol used by NAS 16. For example, in the standard protocol, each dynamic filter is specified in the form;

a.b.c.d/n.

In this format "a.b.c.d" represent an IP address and "n" represents the number of bits of that address which are to be enforced. Thus, if n=32, the whole address is to be enforced. If n has a value less than 32, then only the appropriate part of the address is to be enforced.

In the case of network access servers manufactured by Cisco, a dynamic filter includes the term: "a.b.c.d.X.Y.Z.T". The interpretation of this is that access is to be restricted to an address range, the lower limit of which is X.Y.Z.T and the upper limit of which is a.b.c.d.

After performing the translation in step 152, in a step 153 the access accept message is forwarded to the NAS 16 with a filter identifier in the protocol used by NAS 16.

If in step 151 it is found that the filter identifier is not valid, then a default action is applied in a step 154. The default action can be agreed between the organisation which manages the proxy server 24 and the relevant authentication server a, b or c in advance. The two possibilities for the default action are to forward an access accept message without a filter or to forward an access reject message to the network access server 16.

This process has the advantage that the servers A, B and C can specify filters without any knowledge of the type of network access server which will be used to form a connection. Also, both static and dynamic filters can be specified.

Figure 10:
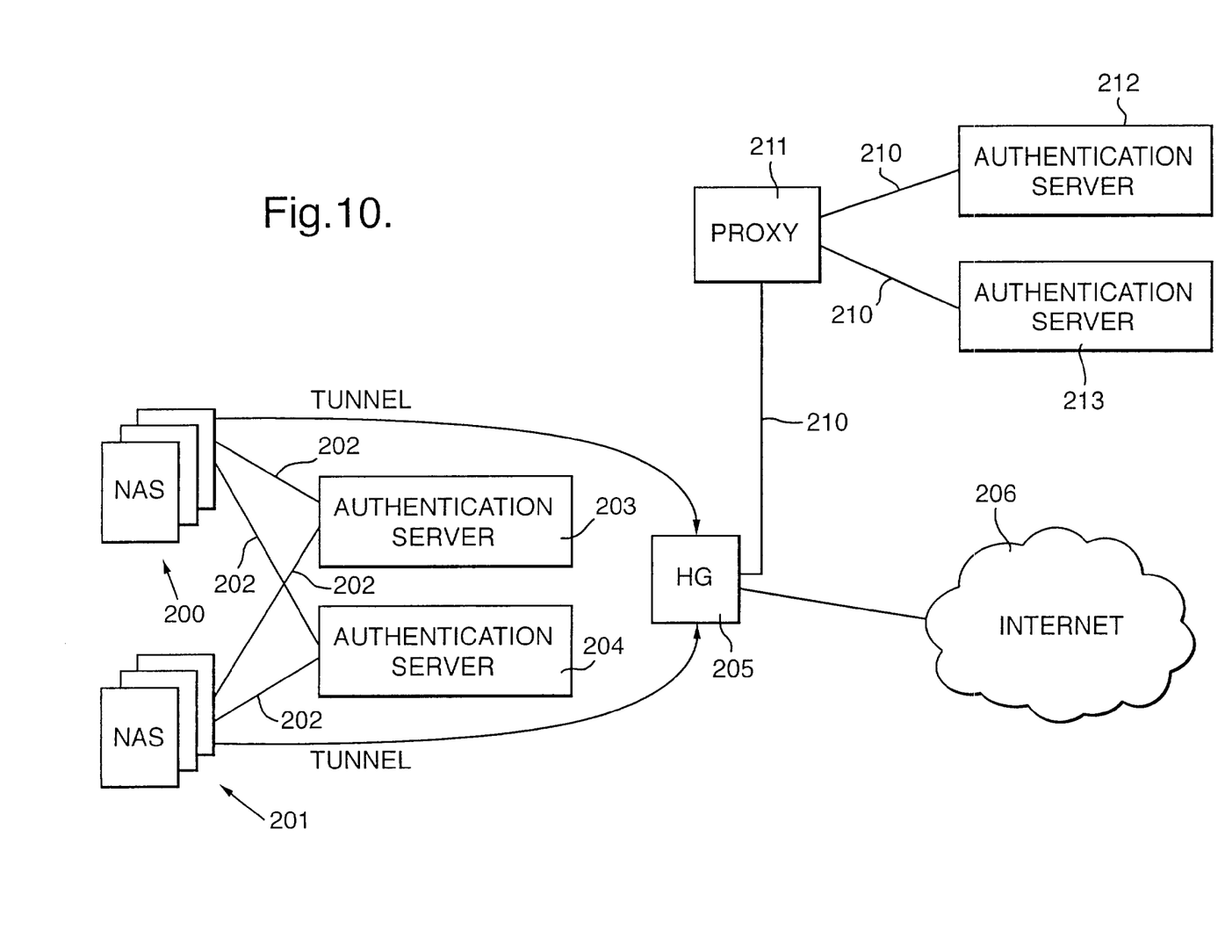
FIG. 10 is a block diagram of another arrangement for connecting computers operated by end users to the public Internet.

Referring now to FIG. 10, there is shown another arrangement for connecting computers operated by end users to the public Internet. This arrangement includes two clusters of network access servers 200, 201 connected to a private data network 202. The private data network 202 is similar to the private data network 20 described with reference to FIG. 1. Two authentication servers 203, 204 and a home gateway 205 are also connected to the private data network 202.

As will be described below, the home gateway 205 can connect computers operated by end users to the public Internet 206. The home gateway 205 is also connected to a second private data network 210, which is similar to the private data network 20 described with reference to FIG. 1. A proxy server 211 and two authentication servers 212 and 213 are also connected to the data network 210.

In this example, the network access servers 200, 201, the authentication servers 203, 204, the home gateway 205 and the proxy server 211 are managed by one organisation and the two authentication servers 212 and 213 are managed by separate organisations.

The network access servers 200, 201 connect computers operated by some end users directly to the public Internet. However, computers operated by other end users are connected to the public Internet via the home gateway 205.

When one of the network access servers 200, 201 receives an access request from a computer operated by an end user, it forwards the access request to one of the authentication servers 203, 204. If the computer making the request is to be connected to the public Internet via the home gateway 205, then the relevant authentication server 203 or 204 sends an instruction to the relevant network access server to build a connection or tunnel to the home gateway 205 for the computer which has made the access request. The network access server then builds a tunnel to the home gateway 205. There are a number of different tunnelling protocols to do this. One of these is the so called L2TP (Layer Two Tunnelling Protocol). This protocol is supported by most network access server vendors.

After forming the tunnel to the home gateway 205, the network access server then forwards the access request message to the home gateway 205. The home gateway 205 is also a virtual network access server. On receiving the access request, it forwards it to the proxy server 211. The proxy server 211 then selects one of the authentication servers 212, 213 and forwards the access request to the selected authentication server. The selected authentication server 212 or 213 processes the access request and sends a response to the proxy server 211. The response will be either an access accept or access reject message. The proxy server 211 then forwards a response to the home gateway 205. The home gateway 205 then either allows or denies the access request in accordance with a response from the proxy server 211. If the home gateway 205 allows the request, then the end user is connected to the Internet 206 through relevant one of the network access servers 200 or 201 and the home gateway 205.

In the arrangement shown in FIG. 10, the proxy server 211 can perform the processes which have been described above with reference to FIGS. 5 to 9.

What is claimed is:

1. A method of processing requests at an access server arrangement for a data terminal operated by an end user to access a data network, said method comprising:
   receiving requests from data terminals at the access server arrangement for access to the data network;
   comparing each request with a table comprising a plurality of different rules and identifying a matching rule comprising a primary choice procedure and a default procedure, the primary choice procedure specifying a remote authentication server;
   in the event that a predetermined criterion, which is indicative of a possibility of a failure relating to the authentication server specified in the primary choice procedure of the matched rule, is not satisfied:
   (i) attempting to forward the access request to the authentication server specified in the matched rule;
   (ii) if a response is received from the authentication server, dealing with the access request in accordance with the response; and
   (iii) if a response is not received from the authentication server, dealing with the access request in accordance with the default procedure specified in the matched rule; and
   in the event that the predetermined criterion, which is indicative of a possibility of a failure relating to the authentication server specified in the primary choice procedure of the matched rule, is satisfied, dealing with each access request matching the matched rule in accordance with said default procedure, as specified in the matched rule, for a predetermined number of times and then attempting to forward a subsequently received access request, matching the same rule, to the authentication server specified in the primary choice procedure of the matched rule.

2. A method as in claim 1, wherein the table comprises a plurality of rules specifying a plurality of authentication servers and wherein a request is matched to a rule in accordance with the value of at least one attribute contained in the access request and further including:
   selecting an authentication server from a plurality of authentication servers in accordance with the value of at least one attribute contained in the access request; and
   in said step of attempting to forward the access request, making an attempt to forward the access request to the selected authentication server.

3. A method as in claim 1, in which the network access arrangement includes a proxy server, the proxy server being responsible for forwarding an access request to an authentication server, receiving any response from the authentication server, and, if appropriate, handling an access request in accordance with the default procedure.

4. A method as in claim 1, in which the predetermined criterion is satisfied if there are repetitive failures to receive a response from an authentication server.

5. A method as in claim 1, which further includes:
   if a response is not received from an authentication server, changing the value held in a counter by one unit in one direction; and
   if a response is received from an authentication server, changing the value held in the counter by one unit in the other direction; and
   the predetermined criterion is reached when the value held in the counter has progressed in said one direction to a predetermined threshold.

6. A method as in claim 5, in which, in the event that the counter has reached said predetermined threshold, the method further includes performing the default procedure for a predetermined number of times, then changing the value held in the counter by one unit in the other direction, then making an attempt to forward the next access request to the authentication server.

7. A network access server configured to operate according to the method of claim 1.

8. A network including at least one network access server according to claim 7 and at least one of said authentication servers.

9. An access server arrangement for controlling access by a data terminal operated by an end user to access a data network, said access server arrangement comprising:
   receiving means for receiving requests from data terminals at the access server arrangement for access to the data network; and
   processing and transmitting means for comparing each request with a table comprising a plurality of different rules and identifying a matching rule, comprising a primary choice procedure and a default procedure, the primary choice procedure specifying a remote authentication server and,
   in the event that a predetermined criterion, which is indicative of a possibility of a failure relating to the authentication server specified in the primary choice procedure of the matched rule, is not satisfied;

(i) attempting to forward the access request to an authentication server specified in the matching rule;
(ii) if a response is received from the authentication server dealing with the access request in accordance with the response; and
(iii) if a response is not received from the authentication server dealing with the access request in accordance with a default procedure specified in the matched rule; and in the event that the predetermined criterion is satisfied, dealing with each access request matching a particular rule in accordance with the default procedure specified in the matched rule for a predetermined number of times and then attempting to forward a subsequently received access request matching the same rule to the authentication server specified in the matched rule wherein the table comprises a plurality of different rules.

10. A network including at least one access server arrangement as in claim 9 and one or more authentication servers operable to receive forwarded access requests from the access server arrangement.

* * * * *